(12) United States Patent
Hagiwara (10) Patent No.: US 7,758,144 B2
(45) Date of Patent: Jul. 20, 2010

(54) PRINTER APPARATUS AND PRINTING METHOD FOR PRINTER APPARATUS

(75) Inventor: Takahiro Hagiwara, Chiba (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 146 days.

(21) Appl. No.: 12/171,012

(22) Filed: Jul. 10, 2008

(65) Prior Publication Data

US 2009/0009816 A1    Jan. 8, 2009

Related U.S. Application Data

(63) Continuation of application No. 11/620,809, filed on Jan. 8, 2007, now Pat. No. 7,413,275.

(51) Int. Cl.
*B41J 2/205* (2006.01)

(52) U.S. Cl. ............................... 347/15; 347/43

(58) Field of Classification Search .................... 347/5, 347/14, 15, 43; 709/203, 218, 219
See application file for complete search history.

(56) References Cited

U.S. PATENT DOCUMENTS 6,883,001 B2 * 4/2005 Abe ..................... 707/10

7,347,378 B2    3/2008 Frohlich et al.
2001/0004742 A1    6/2001 Oike

FOREIGN PATENT DOCUMENTS

| JP | 2002-166608 | 6/2002 |
|---|---|---|
| JP | 2002-248829 | 9/2002 |
| JP | 2004-021462 | 1/2004 |
| JP | 2006-146703 | 6/2006 |
| JP | 2000-315142 | 7/2008 |
| JP | 2005-157686 | 7/2008 |

* cited by examiner

*Primary Examiner*—Thinh H Nguyen
(74) *Attorney, Agent, or Firm*—Turocy & Watson, LLP (57) ABSTRACT

In a printer apparatus of the invention, a file storage unit stores an archive file including plural files each having a reservation keyword, a processing content designation data holding unit holds plural processing content designation data in which the reservation keyword and processing content on the file are made to correspond to each other, a processing content designation data retrieval unit extracts the reservation keyword from the file name of each of the plural files and retrieves one or plural processing content designation data including the extracted reservation keyword among the plural processing content designation data, and a print processing unit print-processes the data to be printed contained in the stored document file in accordance with the processing content on the file held in the processing content designation data holding unit corresponding to the retrieved processing content designation data. By this, printing can be performed at high speed, and convenience of the print processing can be raised.

20 Claims, 7 Drawing Sheets

22: PROCESSING CONTENT DESIGNATION TABLE

| FILE NAME RESERVATION WORD | PROCESSING CONTENT |
|---|---|
| Insert*.* | PAGE INSERTION PROCESSING |
| Maskpattern*.* | MASK PROCESSING |
| Background*.* | BACKGROUND IMAGE OVERLAY PROCESSING |
| Setting*.txt | JOB SETTING INFORMATION SETTING PROCESSING |
| Script.txt | PROGRAM ANALYSIS AND EXECUTION PROCESSING |
| Jimon01*.txt | OVERLAY PROCESSING OF ¥BOX¥Jimon01.bmp |
| ... | ... |

FIG. 8

23: VARIABLE PARAMETER DESIGNATION TABLE

| FILE NAME RESERVATION WORD | PROCESSING CONTENT |
|---|---|
| [0-9999]P | OVERLAY PROCESSING OBJECT PAGE DESIGNATION PROCESSING |
| [1-9]L | LAYER ORDER DESIGNATION PROCESSING IN OVERLAY PROCESSING PAGE |
| allP | OVERLAY PROCESSING ALL PAGE DESIGNATION PROCESSING |
| ... | ... |

FIG. 9

PRINTER APPARATUS AND PRINTING METHOD FOR PRINTER APPARATUS

CROSS-REFERENCE TO RELATED APPLICATIONS

This application claims the benefit of priority from and is a continuation of application Ser. No. 11/620,809 filed on Jan. 8, 2007, the entire contents of which are incorporated herein by reference.

BACKGROUND OF THE INVENTION

1. Field of the Invention

The present invention relates to a printer apparatus and a printing method used in the printer apparatus.

2. Description of the Related Art

In the case where a file created by application software operating on a PC (personal computer) is printed, PDL (Page Description Language) for describing print pages by a page printer, such as Postscript (trade mark or registered trade mark of Adobe Systems Incorporated) or PCL (Printed Control Language), PDF (Portable Document Format) to enable each page to be printed, or the like is generally used as a file format. For example, a file created by application software, such as a word processor or spreadsheet, is once converted in an intermediate processing, and a PDL file is created.

In the case where the user performs printing while a background image, a company logo or the like is superimposed together, the print processing is performed after a processing (superimposing processing) of superimposing the data, such as the background image or company logo, on the data created using the application software.

As techniques to print the background image, there is proposed a technique in which an original image is separated into a background part and a print image, the ground color of a transfer object is detected, and the color of the separated background part is replaced by the detected ground color of the transfer object, so that the color of the background part does not appear in a transferred image (for example, JP-A-2002-166608). Besides, there is also proposed a document editing apparatus in which creation means for creating document information relating to plural electronic documents is provided, and the summary of an electronic document inside a set electronic document can be retrieved (for example, JP-A-2006-146703).

However, in the printing by the printer apparatus of the related art, in the case where vector format data such as complicated line art is heavily used in the file, since the vector format data is not compressed, the size of the PDL file becomes large. Besides, recently, as security measures, a user desires to uniformly insert a specific background image or a company logo into all original documents to be printed. When the superimposing processing to the original documents and the print processing are performed, when the PC of the user inserts data, such as the background image or the company log, into data by using the application software one by one, there occurs a disadvantage that the efficiency is poor.

DETAILED DESCRIPTION OF THE INVENTION

Throughout this description, the embodiments and examples shown should be considered as exemplars, rather than limitations on the apparatus and methods of the present invention.

Hereinafter, embodiments of the invention will be described in detail while using attached drawings as examples.

Figure 1:
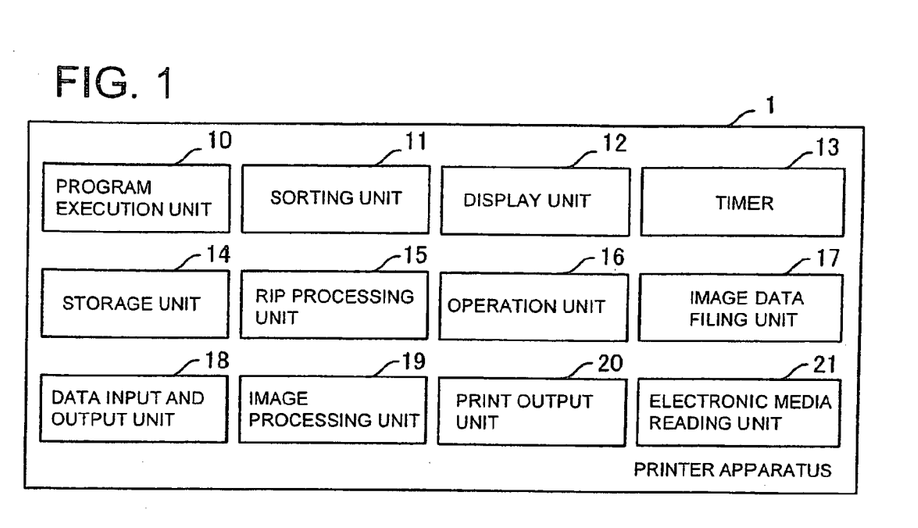
FIG. 1 is a block diagram of a printer apparatus of an embodiment of the invention.
Figure 2:
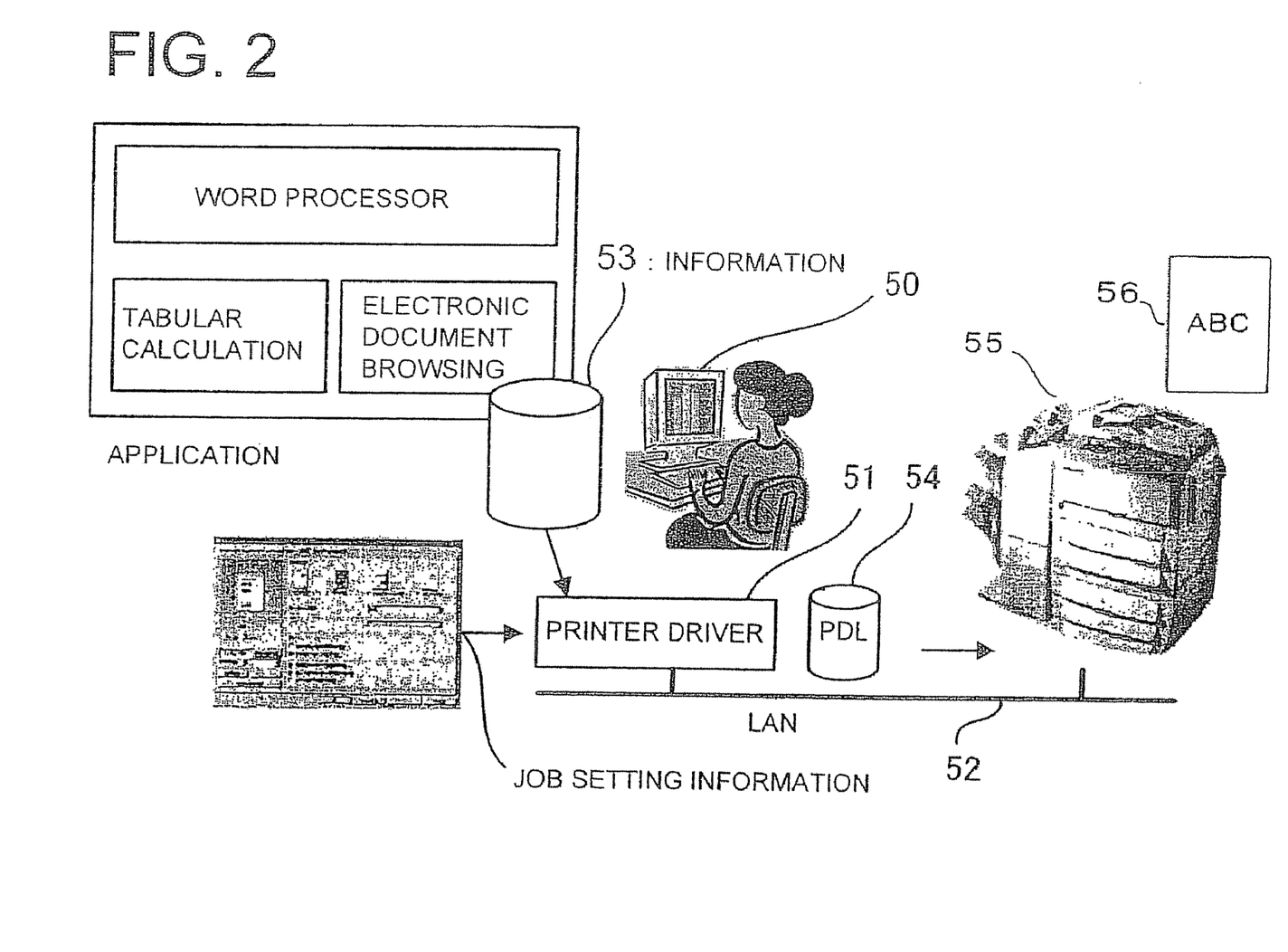
FIG. 2 is a view for explaining an operation of a print processing of the related art.
Figure 3:
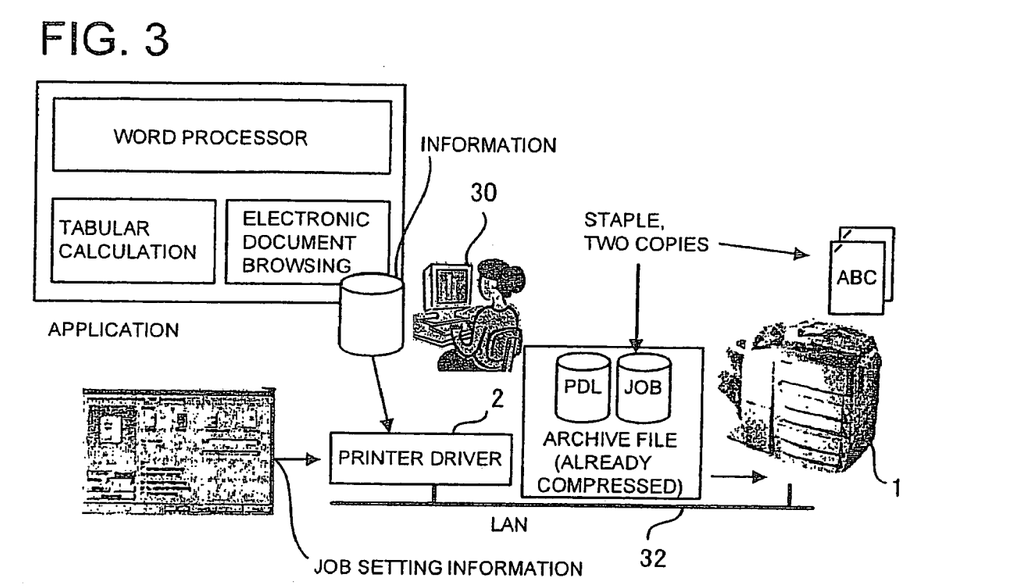
FIG. 3 is a view for explaining an operation of a print processing to which the invention is applied.
Figure 4:
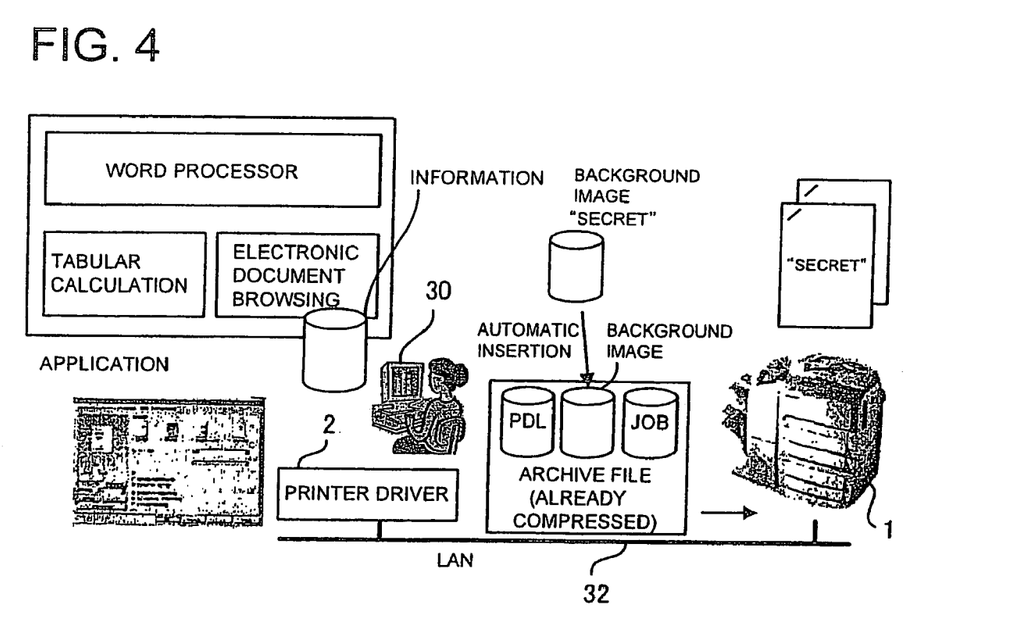
FIG. 4 is a view for explaining a background overlay print function of the printer apparatus of the embodiment of the invention.
Figures 5A, 5B:
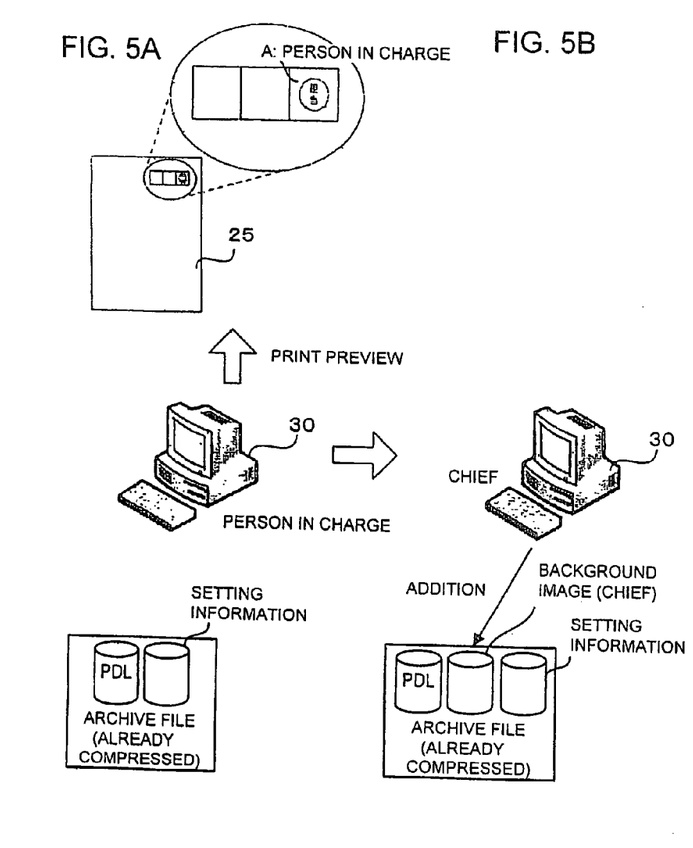
FIG. 5A to FIG. 5C are views showing an example of a printing system of the embodiment of the invention.
Figure 5C:
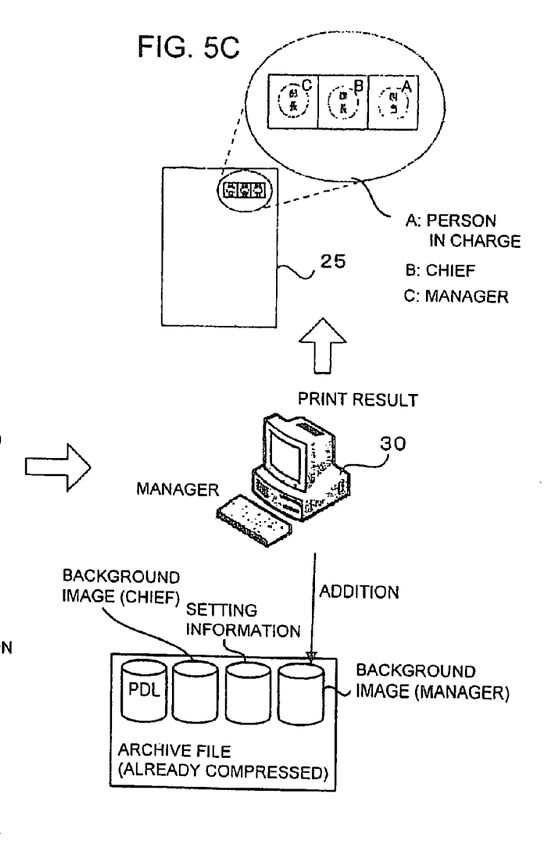
Figure 6:
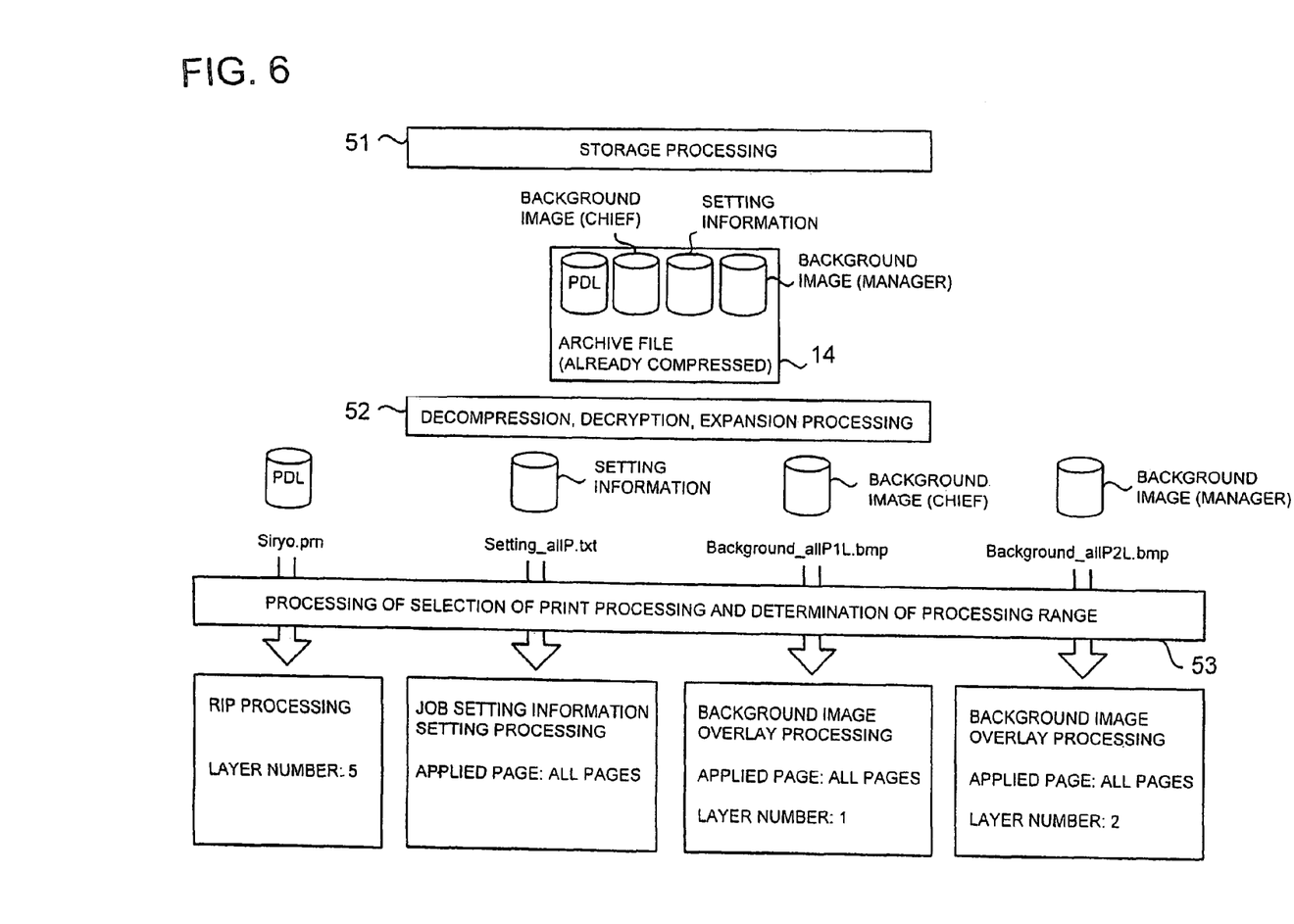
FIG. 6 is a view for explaining a selecting method of a print processing in the printer apparatus of the embodiment of the invention.
Figure 7:
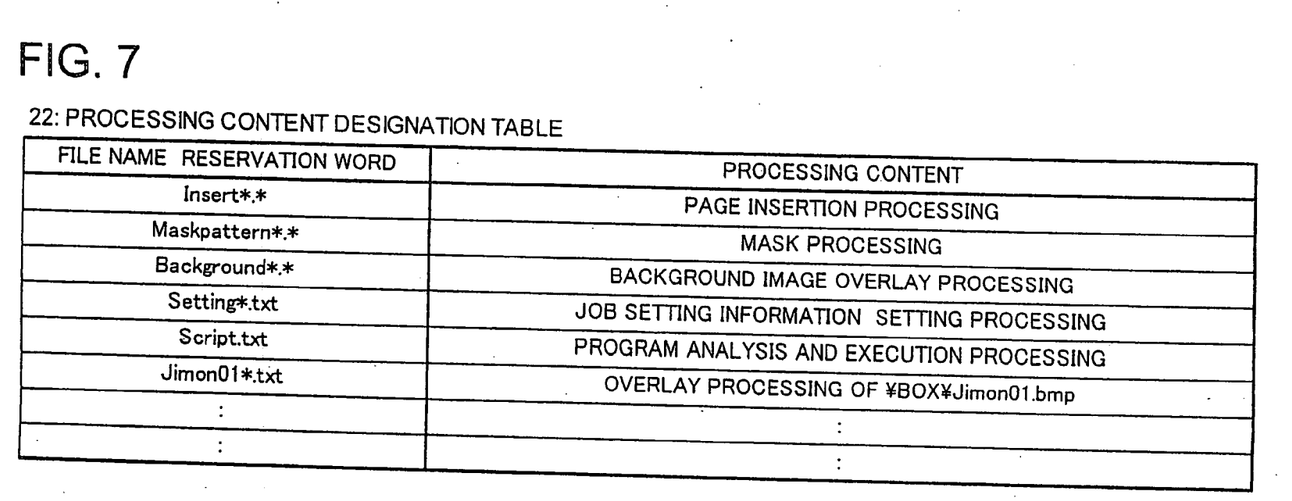
FIG. 7 is a view showing an example of a processing content designation table of the embodiment of the invention.
Figure 8:
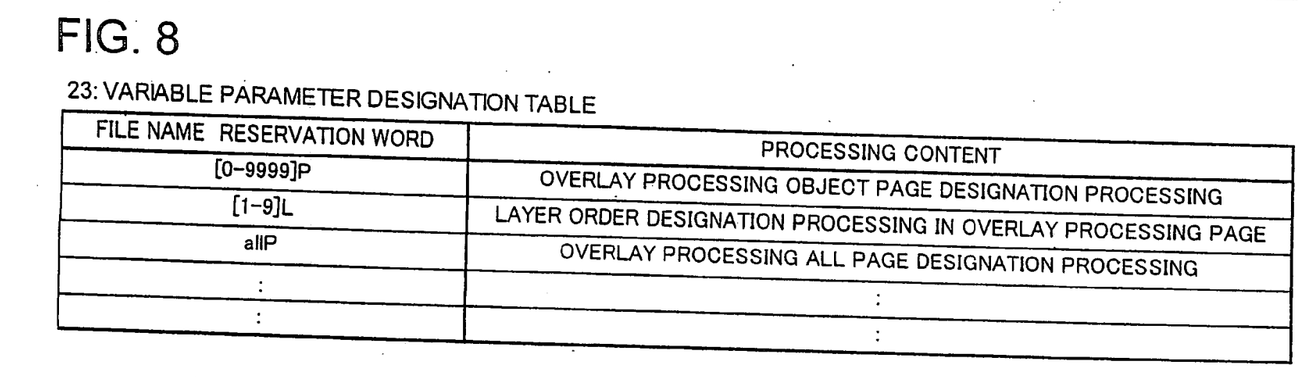
FIG. 8 is view showing an example of a variable parameter designation table of the embodiment of the invention.
Figure 9:
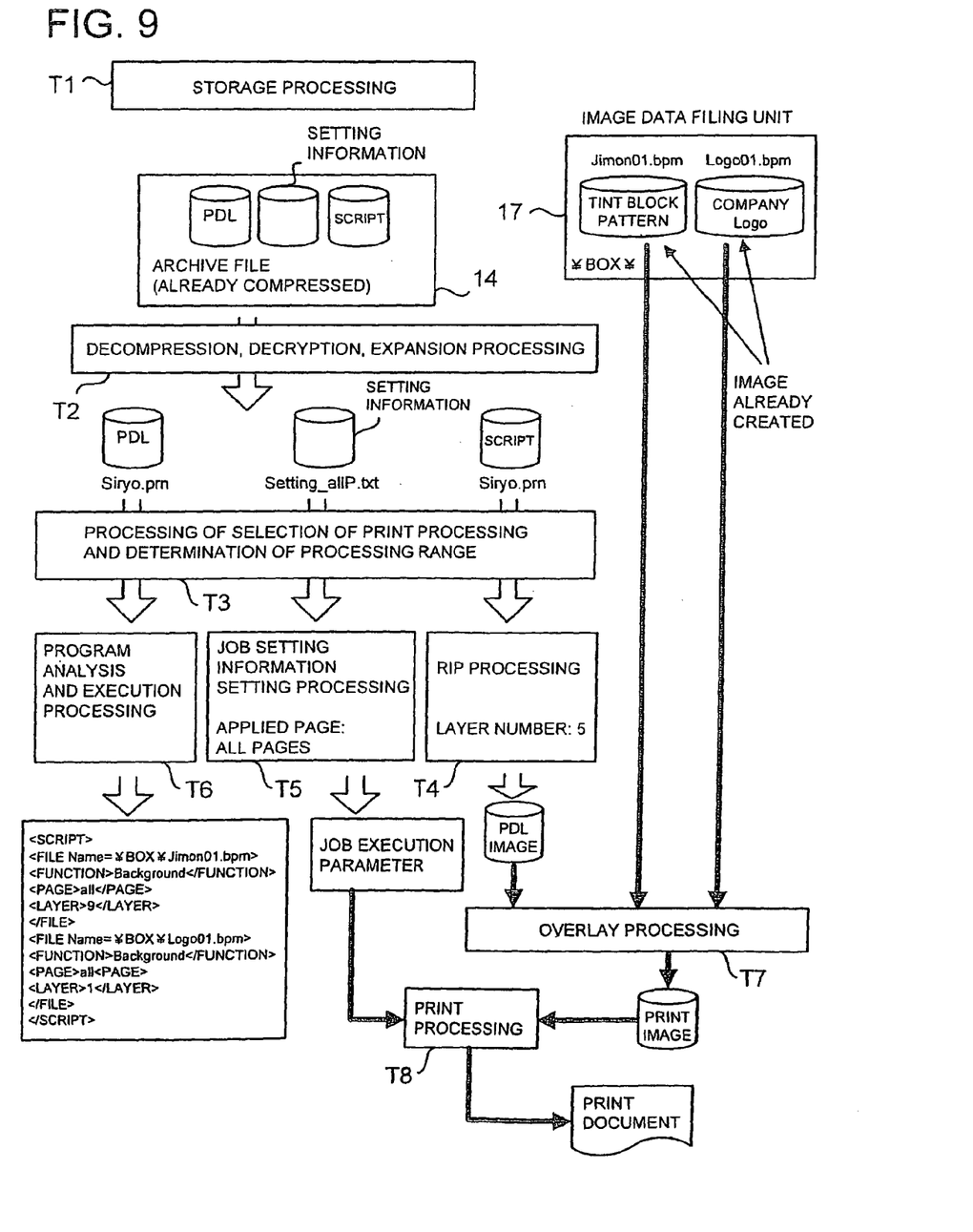
FIG. 9 is a view for explaining a print processing using a file in which a script is described in the printer apparatus of the embodiment of the invention.

Incidentally, in the respective drawings, the same portions are denoted by the same symbols, and duplicate explanations will be omitted. FIG. 1 is a block diagram of a printer apparatus of an embodiment of the invention, FIG. 2 is a view for explaining an operation of a print processing of the related art, FIG. 3 is a view for explaining an operation of a print processing to which the invention is applied, FIG. 4 is a view for explaining a background overlay print function of the printer apparatus of the embodiment of the invention, FIG. 5A to FIG. 5C are views showing an example of a printing system of the embodiment of the invention, FIG. 6 is a view for explaining a selecting method of a print processing in the printer apparatus of the embodiment of the invention, FIG. 7 is a view showing an example of a processing content designation table of the embodiment of the invention, FIG. 8 is a view showing an example of a variable parameter designation table of the embodiment of the invention, and FIG. 9 is a view for explaining a print processing using a file in which a script is described in the printer apparatus of the embodiment of the invention.

As shown in FIG. 1, a printer apparatus 1 of this embodiment includes a program execution unit 10, a sorting unit 11, a display unit 12, a timer 13, a storage unit 14, an RIP (Raster Image Processor) processing unit 15, an operation unit 16, an image data filing unit 17, a data input and output unit 18, an image processing unit 19, a print output unit 20, and an electronic media reading unit 21. The printer apparatus 1 is connected to a LAN through the data input and output unit 18 connected to the LAN and is connected to an external apparatus such as a PC, and a network is formed of the printer apparatus 1, the PC, the LAN and the like.

The RIP processing unit 15 interprets or renders the PDL data or PDL file sent from the network, and creates image data.

The electronic media reading unit 21 reads image data held on a CD-ROM or a memory card such as a compact flash.

The image processing unit 19 converts an image which is read by the electronic media reading unit 21 into printable image data, adjusts the color, brightness or definition, or identifies the image and performs conversion so that a better print output is obtained according to the identification result.

The image data filing unit 17 holds plural processing content designation data in which a reservation keyword and a processing content on a file are made to correspond to each other, and functions as a processing content designation data holding unit. The image data filing unit 17 includes a processing content designation table to hold the processing content designation data, and a variable parameter designation table to designate a print page when an overlay processing is performed. In order to store archive file and the like, the image data filing unit 17 extracts a reservation keyword from a file name of each of plural files contained in the archive file stored in the memory provided in the print output unit 20, and retrieves one or plural processing content designation data including the extracted reservation keyword among the plural processing content designation data held in the processing content designation data table. The image data filing unit 17 functions also as a processing content designation data retrieval unit.

The print output unit 20 is for storing an archive file including plural files which include at least a document file containing data to be printed and described in page units, and a print setting file containing job setting information data relating to print setting content and in which the file name of each of the files has the reservation keyword, and functions as a file storage unit. The print output unit 20 includes a memory to store the archive file. The stored archive file has been subjected to compression processing or encryption processing.

Besides, the print output unit 20 performs print processing of data to be printed contained in the stored document files in accordance with the processing content on the file held in the processing content designation data table corresponding to the processing content designation data retrieved by the image data filing unit 17 as the processing content designation data retrieval unit. That is, the print output unit 20 functions also as a print processing unit.

By this, the data to be printed from the PC is once stored in the memory of the print output unit 20. The print image is stored in the image data filing unit 17, the stored print image data is managed, and the print image is edited and becomes printable again. Further, in the print output unit 20, the image data created by the RIP processing unit 15 or the image data stored in the image data filing unit 17 is printed on paper.

The respective functions of the RIP processing unit 15, the electronic media reading unit 21, the image processing unit 19, the image data filing unit 17, and the print output unit 20 are realized by a CPU (central processing unit), a memory such as a ROM and a RAM, an IC, an LSI and the like.

The program execution unit 10 executes and analyzes a program for suitably controlling the respective functional blocks of the RIP processing unit 15, the electronic media reading unit 21, the image processing unit 19, the image data filing unit 17, and the print output unit 20, and includes also a temporal storage area necessary to perform the execution analysis processing of this program.

The processing of the program execution unit 10 cooperates with each of the storage unit 14 to store the data for a period necessary for the processing, the data input and output unit 18 to exchange the data with the external apparatus and to temporarily spool the data to be printed, the operation unit 16 by which the user operates the printer apparatus 1 and the equipment connected to the network, and the display unit 12 to display the image and the like.

The sorting unit 11 is for sorting (or distributing) the sheets of paper printed by a not-shown printer unit for paper printing and paper transport. The timer 13 is for processing in the printer apparatus 1 and for exchanging data with the external apparatus.

A printing method of the embodiment is for the printer apparatus 1 connected to the network, and first, the printer apparatus 1 holds plural processing content designation data, in which the reservation keyword and the processing content on the file are made to correspond to each other, in the memory to hold the data. The printer apparatus 1 receives the archive file through the network. The printer apparatus 1 extracts the reservation keyword from the file name of each of the plural files of the received archive file. The printer apparatus 1 retrieves one or plural processing content designation data including the extracted reservation keyword among the plural processing content designation data held in the memory. The printer apparatus 1 performs print processing of the data to be printed contained in the received document file in accordance with the processing content on the file held in the memory corresponding to the retrieved processing content designation data.

Next, the operation of the print processing will be described in detail.

In print processing of the related art, as shown in FIG. 2, first, application software operating on a PC 50 sends information 53 such as drawing information to a printer driver 51. The printer driver 51 creates one PDL file 54 from job setting information (input tray, output tray, both-side printing designation, staple processing, etc.) set by using the setting screen of the PC 50 and the information 53 sent from the application software, and sends the created PDL file 54 to a printer apparatus 55 through a LAN 52. The sent PDL file 54 is converted into printable raster data by an RIP processing unit of the printer apparatus 55, and the converted data 56 is printed on paper.

In the print processing of this embodiment, as shown in FIG. 3, in a printer driver 2, job setting information (input tray, output tray, both-side printing designation, staple processing, etc.) set by using the setting screen of a PC 30 and drawing information from the application software are written into separate files, the written plural files are archive-processed, and the archive-processed archive file is sent to the printer apparatus 1. In the print system of the embodiment, the archive processing indicates the respective processings of a function to merge plural files into one file, a function to compress the file, a function to manage plural files through a tree structure or directory structure, and a function to encrypt the data. A processing content designation table to represent plural processing contents relating to the print processing in the printer apparatus 1 and a variable parameter designation table are described in the job setting information. Besides, the job setting information of the archive file can also include information concerning the number of print copies, and by doing so, the printer apparatus 1 can also designate, for example, the number of print copies of the staple processing. The job setting information may be edited by the user.

Merits obtained by the print processing of FIG. 3 are such that the printer apparatus 1 can handle plural PDL files, and, since the printer driver 2 creates plural files for respective functions, such as a setting file and a file for overlay image processing, the printer apparatus 1 can choose plural files according to the object, and it becomes easy for the user to perform work such as addition, deletion or edition of data.

According to the invention, plural files corresponding to plural functions are not individually sent, but are collected into one file and are sent to the printer apparatus 1, so that those plural files are correlated to one job as structural elements of the one job, and the one file is compressed and encrypted, and accordingly, the size of the file to be transferred to and from the printer apparatus 1 or to be processed by the printer apparatus 1 becomes small, and printing can be performed at high speed, and the security can be secured.

Hereinafter, the invention will be described in detail.

In the case where the user superimposes a mark to represent a secret on the background of data to be printed and performs printing (overlay printing), as shown in FIG. 4, the background image of the mark to indicate the secret is created by the operation unit 16, and the created background image is registered in the PC 30. That is, the PC 30 is set so that the printer driver 2 can process the background image.

The printer driver 2 inserts the registered background image data of the mark to represent the secret or the background image data file into the archive file created as shown in FIG. 3 and sends the inserted background image data, together with the PDL file and job setting information, to the printer apparatus 1. In this way, the background overlay printing is realized. As a merit of the background overlay print processing, since the printer driver 2 is not required to perform complicated processing such as superposition of plural different image data, the high speed processing becomes possible. Besides, when the hardware to execute the complicated superposition processing at high speed is provided in the printer apparatus 1, the whole printing can be processed at high speed.

In the flow of the print processing of FIG. 4, although the image data to be printed as the background is automatically inserted by the printer driver 2, plural users can insert desired background image data, or an equipment such as the PC 30 connected to the LAN 32 can automatically insert the background image data. For example, as shown in FIG. 5A to FIG. 5C, in the case where an electronic document 25 created by a user A as a person in charge is printed, the archive file 25 is created in which only the seal or signature of the user A is printed (FIG. 5A), and when the approval of a user B as a chief is obtained, an imprint image of an approval seal of the user B or a signature image is added to the archive file 25 (FIG. 5B), and further, when the approval of a user B is obtained, an imprint image of an approval seal of the user C as a manager or a signature image is added to the archive file 25 (FIG. 5C). According to the invention, it becomes possible to systematize the flow of business as stated above, that is, the workflow, and high speed printing can be performed using the existing PDL file, and the security measures can be taken.

Next, a method in which the printer apparatus 1 selects a desired print processing from plural print processings will be described. As shown in FIG. 6, at step S1, the printer apparatus 1 once stores the archive file sent from the printer driver 2 into the storage unit 14 such as the HDD (hard disk drive). Next, at step S2, the printer apparatus 1 performs a processing of decompressing the stored archive file, a processing of decrypting the archive file, and a processing of expanding the archive file into plural files. In the expanding processing at this step S2, the printer apparatus 1 gives a desired name to each file so that each of the plural files can be specified. In FIG. 6, as an example, the PDL file is given "Shiryou.prn", the file including the job setting information is given "Setting_allP.txt", the seal image or signature image approved by the user B is given "Background_allP1L.bmp", and the seal image or signature image approved by the user C is given "Background_allP2L.bmp".

At step S3, the printer apparatus 1 selects a processing corresponding to each file from the file name by which each of the plural expanded files is specified and the header information at the head of each file.

As shown in FIG. 7, the printer apparatus 1 retrieves the processing content designation table 22, and selects the processing content from the file name. For example, with respect to the file having the file name "Setting_allP.txt", as the job setting processing, both-side printing designation or staple processing designation, or a job parameter different from a default value, such as designation of the number of copies, is set. The file of the file name "Background_allP1L.bmp" and the file of the file name "Background_allP2L.bmp" are recognized as the background image and the image data for performing the overlay processing, respectively, and are registered in the hardware in the printer apparatus 1.

Besides, a reservation keyword as a reservation word held in the processing content designation table 22 includes a fixed portion and a variable portion. "Setting*.txt" of "Setting_allP.txt" corresponds to the fixed portion, and "_allP" corresponds to the variable portion. The reserved keyword is defined by a combination of the fixed portion and the variable portion, and is previously registered in the processing content designation table 22. The processing content on the file held in the processing content designation data table 22 is a processing selected from an image overlay print processing on a file, an image insertion processing on a file, a mask processing on a file and the like.

In the case where the overlay print processing is performed, as shown in FIG. 8, in the print setting file of the job setting information data, text commands to respectively represent the overlay processing, the image insertion processing, and the mask processing are described. Thus, in order to instruct the print setting file on the respective functions by using the commands, a file having a name such as "Script.txt" is held in the processing content designation table 22.

Next, the operation of the case where the file name is "Insert*.*", "Maskpattern*.*" or "Script.txt" will be described.

The printer apparatus 1 previously determines that "Insert*.*" means a processing (page insertion processing) of inserting image data or an image file having "Insert*.*" to a desired position of the file. In the case where the file name of the file expanded at step 2 by the printer apparatus 1 is "Insert*.*", at step S3, the printer apparatus 1 selects a desired processing among plural processings, and prints the Insert image file after the designated page on which an image created in the PDL format is printed or after the image to be printed.

Besides, the printer apparatus 1 previously determines that "Maskpattern*.*" means an image file to designate a threshold. In the case where the file name of the expanded file at step S2 is "Maskpattern*.*", after the selecting of the processing at step S3, with respect to the image created in the PDL format, the printer apparatus 1 compares a pixel included in the image with the threshold. Here, in the case where the pixel of the comparison object is lower than the threshold, the printer apparatus 1 prints the pixel of the comparison object in a desired color such as white. The printer apparatus 1 compares each pixel included in the image with the threshold. By this, in the case where the user tries to outline a specific portion in the image, "Maskpattern*.*" can be used. In the case where an outline processing is performed, a similar outline processing is performed on an image of the same layer designated after the outline processing. The layer information indicating this layer, together with page information, is included in the variable portion of the reservation keyword.

Further, a file having "Script.txt" is a file used in the case where the processing becomes complicated when the printer apparatus 1 uses only the method of designating the file name, or in the case where it is necessary for the printer apparatus 1 to refer to data or the like not included in the archive file. The file having the file name "Script.txt" is a file in which plural processings, such as a page insertion processing using "Insert*.*" and a comparison processing of pixels using "Maskpattern*.*", can be described like a program (like a program is described). Incidentally, the processing of the file having "Script.txt" will be described later.

Besides, a file included in the archive file can also be used for a processing concerning data different from the image data. In the case where the file name is, for example, "Jimon01*.txt", like "overlay processing of \BOX\Jimon01.bmp", the printer apparatus 1 performs a processing having the content to designate different image data "Jimon01.bmp". In other words, the printer apparatus 1 of this embodiment further includes an image data file holding unit configured to hold the image data file, and with respect to the processing content on the file to be held in the processing content designation data table 22, this image data file is used and the overlay print processing on the file of the image is performed. In this case, the printer apparatus 1 can also perform a processing using, so to speak, an "empty file" which has a file name of "Jimon01_all.txt" and in which data to represent the content is not included. In brief, the file name is important.

The printer apparatus 1 determines the file having the file name not applicable to the reservation word of FIG. 7 to be the PDL file, and performs the RIP processing. Next, with respect to a portion defined using a "*" symbol as a wild card portion of FIG. 7, the printer apparatus 1 determines that an arbitrary character enters in the wild card portion, refers to the variable parameter designation table of FIG. 8, and determines the processing content concerning the file having the file name including the "*" symbol. The processing using the wild card portion can be used to designate a page as an object of a processing, the order of superposition in the overlay print processing and the like. For example, the portion of "allP" in "Setting_allP.txt" is used to designate the order of pages, the order of superposition and the like, and "allP" means that the object range of the processing includes all pages. Similarly, also with respect to the background overlay processing of "Background_allP1L.bmp" or "Background_allP2L.bmp", it is meant that the background overlay processing is applied to all pages.

Besides, when page designation is performed, when designation of "allP" and each page designation such as "1P_2P" overlap, the printer apparatus 1 can be set so that the processing of each page is given priority. That is, the printer apparatus 1 overwrites the initial setting value with a parameter or image designated by "allP" or parameter data or image data, and overwrites it with a parameter or image designated by "1P_2P.

As stated above, the processing content designation data table 22 correlates the page information with the content of the image overlay print processing on the file and holds them. Specifically, with respect to the page as the object of the overlay printing, the processing content designation data table 22 holds individual page information, page information of all pages, and priority information of the overlay printing, and in the case where file names of plural files expanded from the archive file include both the reservation keyword to designate all pages and the reservation keyword to designate the individual page, based on the priority information, the print output unit 20 performs the print processing concerning a portion where the two reservation keywords overlap among the file names.

Also with respect to "1L", "2L", . . . , "9L" after "allP" of FIG. 8, similarly, the printer apparatus 1 can designate the order of overlap of images when the background overlay processing is performed. The meaning of the numeral in this case is such that, for example, 1 represents the highest level layer, and 9 represents the lowest level layer. The printer apparatus 1 can also perform the processing without performing the designation processing of "1L" or the like, and in the case where the designation is not performed, the printer apparatus 1 can previously determine that a desired numeral (for example, the middle 5) from 1 to 9 is designated. By this, the image file created in the PDL format is not designated, and the processing corresponding to 5 can be made to be performed.

Besides, in the case where the same layer number is designated for the objective one file, the printer apparatus 1 previously determines that the logical sum processing is performed on the file. By this, since the logical sum processing is performed, a processing such as an overprint processing in which the respective color components are added is performed. In this case, on the paper outputted as the result of printing, the seal of the user B is printed at the highest level, the seal of the user C is printed at the second from the highest level, and further, the image created as the PDL file is printed at the third from the highest level. In the overlay processing, since a white blank portion of the paper is transmission processed, according to the printer apparatus 1 of the invention, at a level higher than the image created as the PDL file, for example, only red portions representing the respective seals of the user B and the user C are overwritten on the created image. Besides, print output is performed so that the image created in the PDL format is printed in a portion different from the overwritten portion in the created image. The same processing is performed also in the case where the signature image is used.

Next, an example using "Script.txt" will be described. The printer driver 2 includes, in the print archive file, "Shiryou.prn" of the PDL file as the print document, "Setting_allP.txt" as a file in which job setting information is described, and "Script.txt" as a file in which a script is described. As shown in FIG. 9, after a storage processing (step T1), the printer apparatus 1 performs at least one processing or all processings of decompressing, decrypting and expanding of the archive file (step T2), and expands it into plural individual files in which the compression processing or the encryption processing is removed (step T3). The file having the file name "Shiryou.prn" is rendered by the RIP processing unit 15 (step T4), and by this, data "PDL image" in raster format is obtained. The setting content of the file having the file name "Setting_allP.txt" is registered as a job execution parameter (step T5) and is used for control of both-side control, staple control, or control of the number of copies. With respect to the file having the file name "Script.txt", a necessary processing, such as analysis of a program or execution, is performed by the program execution unit 10 (step T6).

In the case where a reference processing to the processing content designation table 22 or the variable parameter designation table 23 is performed, the overlay processing is performed on the image file specified by "\BOX\" indicating the place of the image data filing unit 17 in which the image data of the printer apparatus 1 is filed, and the file name such as "Jimon01.bmp" or "Logo01.bmp" (step T7). The overlay processing is performed on all pages. As the layer of this case, "9" and "1" are designated to the files of "Jimon01.bmp" and "Logo01.bmp", respectively. Since both "Jimon01.bmp" and "Logo01.bmp" in the image data filing unit 17 perform the overlay processing by the script described in "Script.txt", they are registered in the hardware, such as the CPU or the memory of the printer apparatus 1, which can perform the overlay processing, and the hardware to execute the overlay processing combines the image represented by the file of "Jimon01.bmp" or "Logo01.bmp" and the PDL image, and outputs the combined image as the print image. The print output unit 20 both-side processes the data of the output print image in accordance with the job execution parameter, and performs printing on a desired number of papers (step T8), and by this, the print document is created. The "Jimon01.bmp" and "Logo01.bmp" are images of a tint block pattern or a company logo created by an administrator or a user using a tool or a storage function of a print image or a scan image, and what are previously prepared according to sheet sizes or directions of sheets are used. Thus, the hardware for the overlay processing has only to perform a simple logical operation, and in this way, according to the invention, the high speed processing becomes possible.

As stated above, in the system of the related art using the PDL file to simply perform printing, the PDL file is discarded each time the printing is performed, however, according to the invention, the PDL file once created is again used and a new document can be created, and for example, practical use in the workflow becomes possible.

Besides, as stated above, since the PDL file is compressed and the file size becomes small, the printing speed is also raised, with respect to the tint block pattern, company logo or the like, the original data is not processed, a desired image with the tint block pattern or the like as the background image is automatically printed, and the security can be improved.

Incidentally, "\" included in the directory name can be replaced by "\". The file name or the like is one example, and can be variously changed.

In the printing method of the related art, in the case where large image data is sent, the image data is described as compressed data in each PDL. The PDL file is created by the printer driver in the PC, and the created PDL file is sent to the printer apparatus through the network or the like, rendering is performed by this printer apparatus, and the data to be printed is printed on paper. At the time of creation of the PDL file, the data to be printed and the print setting information data are described in one file in accordance with the grammar defined in the PDL format. When the data is described in the file, raster format data such as bit map image is compressed, and the compressed data is taken in the PDL file.

As stated above, according to the invention, the PC connected to the network archives the PDF file, the setting file, and the background image collectively for the printer apparatus 1 which can perform printing on paper, and sends the archive file to the printer apparatus, and accordingly, the printing can be performed at high speed using the existing PDL file, and the usability can be improved. Further, since the PC side compresses the archive file at the time of creation of the archive file, the print file can be made compact.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. An image processing apparatus comprising:
a file storage unit configured to store a document file containing data to be printed and a print setting file with a first keyword;
a holding unit configured to hold a processing data including a processing content associated with a second keyword;
a retrieval unit configured to extract the first keyword from the print setting file stored in the file storage unit, and to retrieve the processing data associated with the second keyword matched up with the extracted first keyword; and
a print unit configured to print the data to be printed in accordance with the processing content included in the processing data retrieved by the retrieval unit.

2. The image processing apparatus of claim 1, wherein the document file is described in page units.

3. The image processing apparatus of claim 1, wherein the first keyword is extracted from the file name of the document file.

4. The image processing apparatus of claim 1, wherein the first keyword includes page information.

5. The image processing apparatus of claim 1, wherein the first keyword includes layer information.

6. The image processing apparatus of claim 1, wherein the print setting file includes information concerning the number of print copies.

7. The image processing apparatus of claim 1, wherein the second keyword is held in a format of data table designating processing content.

8. The image processing apparatus of claim 1, wherein the processing content is an overlay print processing on an image of the file.

9. The image processing apparatus of claim 1, wherein the processing content is an image insertion processing on the file.

10. The image processing apparatus of claim 1, wherein the processing content is a mask processing on the file.

11. An image processing apparatus comprising:
a file storage unit configured to store a document file containing data to be printed and a print setting file with a first keyword;
a holding unit configured to hold a processing data including a processing content associated with a second keyword;
a retrieval unit configured to extract the first keyword from the print setting file stored in the file storage unit, and to retrieve the processing data associated with the second keyword matched up with the extracted first keyword; and
a processing unit configured to have the data to be printed with the processing content included in the processing data retrieved by the retrieval unit.

12. The image processing apparatus of claim 11, wherein the document file is described in page units.

13. The image processing apparatus of claim 11, wherein the first keyword is extracted from the file name of the document file.

14. The image processing apparatus of claim 11, wherein the first keyword includes page information.

15. The image processing apparatus of claim 11, wherein the first keyword includes layer information.

16. The image processing apparatus of claim 11, wherein the print setting file includes information concerning the number of print copies.

17. The image processing apparatus of claim 11, wherein the second keyword is held in a format of data table designating processing content.

18. The image processing apparatus of claim 11, wherein the processing content is an overlay print processing on an image of the file.

19. The image processing apparatus of claim 11, wherein the processing content is an image insertion processing on the file.

20. An image processing method comprising:
storing a document file containing data to be printed and a print setting file with a first keyword;
extracting the first keyword from the stored print setting file, and retrieving a held processing data which includes a processing content associated with a second keyword associated with the second keyword matched up with the extracted first keyword; and
holding the data to be printed together with the processing content included in the retrieved processing data.

* * * * *